(12) United States Patent
Young

(10) Patent No.: US 7,460,503 B2
(45) Date of Patent: Dec. 2, 2008

(54) METHOD FOR BEACON REBROADCAST IN CENTRALLY CONTROLLED WIRELESS SYSTEMS

(75) Inventor: Song-Lin Young, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 867 days.

(21) Appl. No.: 10/831,097

(22) Filed: Apr. 23, 2004

(65) Prior Publication Data

US 2005/0169292 A1      Aug. 4, 2005

(51) Int. Cl.
*H04Q 7/00*      (2006.01)
*H04Q 7/24*      (2006.01)
*H04L 12/28*     (2006.01)
*H04H 20/71*     (2008.01)

(52) U.S. Cl. .................. 370/331; 370/338; 370/392; 455/3.01

(58) Field of Classification Search ................. 370/310, 370/310.1, 310.2, 351, 352, 355, 389, 398, 370/422, 431, 432, 458, 471, 475, 901, 902, 370/912, 913, 329, 331, 334, 338, 392, 400, 370/401; 455/3.01, 151.2, 426.2, 554.1, 455/554.2

See application file for complete search history.

(56) References Cited

U.S. PATENT DOCUMENTS

| 5,519,706 | A | * | 5/1996 | Bantz et al. | ............... 455/435.2 |
| 5,894,480 | A | * | 4/1999 | Hoffert et al. | ............... 370/389 |
| 6,104,712 | A | | 8/2000 | Robert et al. | |
| 6,349,210 | B1 | | 2/2002 | Li | |
| 6,507,587 | B1 | | 1/2003 | Bahl | |
| 6,665,311 | B2 | | 12/2003 | Kondylis et al. | |
| 6,751,200 | B1 | * | 6/2004 | Larsson et al. | ............... 370/255 |
| 6,950,433 | B1 | * | 9/2005 | Okamoto | ............... 370/392 |
| 7,002,938 | B2 | * | 2/2006 | Hester et al. | ................ 370/330 |
| 2003/0199279 | A1 | | 10/2003 | Roberts et al. | |
| 2005/0058084 | A1 | * | 3/2005 | Hester et al. | ................ 370/254 |

FOREIGN PATENT DOCUMENTS

| EP | 1207654 A2 | 5/2002 |
| WO | WO 01/65773 A2 | 9/2001 |
| WO | WO 02/39665 A2 | 5/2002 |
| WO | WO 02/063806 | 8/2002 |

OTHER PUBLICATIONS

Roger M. Whitaker, Leigh Hodge, and Imrich Chlamtac, Bluetooth Scatternet Formation: A Survey, Feb. 2, 2004, Elsevier B.V., pp. 408-409.*

* cited by examiner

Primary Examiner—Chirag G Shah
Assistant Examiner—Ashley L Shivers
(74) Attorney, Agent, or Firm—Robert D. Varitz; Thomas R. Berthold

(57) ABSTRACT

A method of beacon rebroadcast for use in a packet-based, centrally-controlled, wireless network includes embedding auxiliary network information in a header portion of a packet transmitted over the network by a central controller; receiving a packet having auxiliary network information therein by a device in the network; rebroadcast, by the device in the network, of the packet having auxiliary network information therein in a predetermined time slot, wherein the predetermined time slot is predetermined by the central controller; and receiving, by a device not already on the network, of the auxiliary network information bearing packet, thereby allowing the device not already on the network to join the network.

2 Claims, 3 Drawing Sheets

METHOD FOR BEACON REBROADCAST IN CENTRALLY CONTROLLED WIRELESS SYSTEMS

FIELD OF THE INVENTION

This invention relates to wireless networks, and specifically to a method of rebroadcasting packets having auxiliary network information in a header thereof, which auxiliary network information provides information to enable a device to join the network or to ignore the packet as belonging to another network.

BACKGROUND OF THE INVENTION

Broadcasting is the typical mechanism to allow all devices in a wireless communication systems, within the radio coverage area of a transmitting device, to learn/retrieve relevant information necessary for properly performing network functions. In a central-control type system, the coordinator, also referred to as a controller, or access point, is the device responsible for sending beacon packets to accomplish this function. Beacon packets contain information, such as network timing, reservations of channel time allocation, and other essential network information under control of the coordinator.

This approach works well in a simple network, wherein one controller controls all devices operating on the network, and any additional devices which join the network. It also works well when the network is deployed in an infrastructure scenario, e.g., wherein any device is guaranteed to find the beacon packets from at least one access point (AP). However, correct and adequate operation is problematic when a network is configured in an ad hoc manner, wherein the overall network topology changes dynamically. In an ad hoc network, a device may not necessarily be in a coverage area of the beacon-sending coordinators. There may also be occasions when multiple networks operate simultaneously, with overlapping coverage areas because of close proximity of the coordinators. In the former case, a device may not be able to find the required network resources for its intended application; in the latter case, coexistence and optimized use of radio resources among the involved networks may not be possible. Both cases likely occur in home networking environments, wherein devices are deployed without pre-planning, and wherein applications need to support plug-and-play with little user intervention. Moreover, portable devices and/or complicated layout configurations cause dynamic network topology because of changing radio coverage.

Existing wireless systems rely on a centralized topology for maintaining the clock/timing of networks for device synchronization. This task is normally achieved by one designated device which repeatedly sends beacon signals according to a pre-determined interval, referred to as a "superframe." Because the beacons occur periodically, other devices may either acquire access to the network by sensing the presence of a beacon, or may simply maintain synchronization by referencing the starting point of each beacon. There are various names for the device responsible for beacon transmissions, e.g., access point in 802.11 WLAN (AP), coordinator in 802.15.3 piconet (PNC) (IEEE Std 802.15.3™-2003, Part 15.3: Wireless Medium Access Control (MAC) and Physical Layer (PHY) Specifications for High Rate Wireless Personal Area Networks (WPANs)), controller, or master, in some TDMA type networks. In the following descriptions, the term "PNC" is used generally, however, the scope of this invention is not limited to that of IEEE 802.15.3 WPAN protocols, and is applicable to any network protocol so long as the mechanism of maintaining superframe and/or beacon timing are the same or similar to that of IEEE 802.15.3, and channel time allocation is made via request/grant reservation to/from the coordinator.

Referring now to FIGS. 1 and 2, a typical network configuration, e.g., a piconet, of consideration and the associated timing chart of packet exchange among PNC/devices, respectively, is depicted generally at 10 in FIG. 1. Solid arrows 12, 14, indicate the direction of packet transmissions. As previously mentioned, PNC 16 is responsible for sending beacons. Both Dev#1 & Dev#2 receive beacons from PNC and decode them to retrieve timing information. To facilitate traffic for user applications, one or more reservations (Res—dotted arrows 18, 20) may be setup, as long as there is available time in the superframe for PNC 16 to allocate them. In general, each reservation includes one or more dedicated time slots for a pair of devices, e.g., Res#1 18, or between PNC and a device, e.g., Res#2 20. In either case, request of the reservation goes through negotiation with PNC 16. The reservation request/negotiation process is not a part of this invention; an example may be found in IEEE 802.15.3 WPAN Standard. Once a reservation is granted, two devices can communicate to each other in the designated time slot, without contention from other devices in the piconet.

U.S. Pat. No. 6,665,311, for Method and apparatus for adaptive bandwidth reservation in wireless ad-hoc networks, to Kondylis et al., granted Dec. 16, 2003, describes a routing technique which separates the signaling and data transmission portions of a data frame. The data portion also includes a reservation confirmation portion which allows reservations made during the signaling portion of the frame to be confirmed immediately prior to transmission of the data.

U.S. Pat. No. 6,507,587, for Method of specifying the amount of bandwidth to reserve for use in network communications, to Bahl, granted Jan. 14, 2003, describes a system wherein a reservation is performed by dividing the communication channel into a plurality of frames, dividing each of the frames into a plurality of slots, and dividing some of the plurality of slots into a plurality of mini-slots. The mini-slots are provided for use by the multiple communication sources to request the establishment of a new voice, data, or video transmission connection over the communication channel.

U.S. Pat. No. 6,349,210, for Method and apparatus for broadcasting messages in channel reservation communication systems, to Li, granted Feb. 19, 2002, describes a system for reliable multicast data transmission. It utilizes redundant Request-to-Send type or broadcast notice messages or packets. A source node repeatedly transmits a sequence of these messages over a system reservation channel with each message containing a sequence identifier. The receiving nodes determine the commencement of broadcasting data by recognizing the last broadcast notice message in the sequence.

U.S. Pat. No. 6,104,712, for Wireless communication network including plural migratory access nodes, to Roberts et al., granted Aug. 15, 2000, describes a distributed access network achieved by providing plural migratory, or roving, access nodes to populate a region of desired service, optionally determining a node-to-node route between a source and destination, and initiating a data transfer between the source and destination by way of the migratory nodes.

U.S. Patent Publication No. 20030199279, for Method of accommodating overlapping or adjacent networks, of Robert et al., published Oct. 23, 2003, describes a system where avoidance of interference in a WPAN is achieved initially in a PHY layer (code set changes) and, subsequently in a MAC layer (merging piconets). The approach used for merging piconet relies on detecting beacons and having two piconets within range of each other.

WO0239665 for Coordinated inquiry and page procedures in an ad-hoc wireless network, of Rune, published May 16, 2002, describes a method by which a central controller manages subordinate networks. The reference presumes connections exist among all controllers.

EP1207654A2, for Coexistence techniques in wireless networks, of Shellhammer et al., published May 22, 2002, describes provision of techniques for frequency coordination among two different wireless network protocols, operating in close proximity with one another. Coordination is accomplished by the use of a coordinator associated with the base station for, in turn, activating the first radio transceiver, deactivating the first radio transceiver, activating the second radio transceiver, and deactivating the second radio transceiver. The coordinator in this reference is physically attached to both radio transceivers.

WO0165773A2, for Scheme for managing overlapping wireless computer networks, of Gubbi et al., published Sep. 7, 2001, describes a scheme for sharing a channel during a contention free period of communications between two or more basic service sets (BSSs), including network components, in an overlapping region of a wireless computer network. The reference uses point coordinators, which are stationary rather than portable. A proxy coordinator of the reference needs to be identified for broadcasting beacons in the overlapped area.

WO2002063806 A2 for System, method, and computer program product for sharing bandwidth in a wireless personal area network or a wireless local area network, of Shvodian, published Aug. 15, 2002, describes an access scheme wherein devices share bandwidth via the same coordinator, in a simple, i.e., one, piconet scenario.

SUMMARY OF THE INVENTION

A method of beacon rebroadcast for use in a packet-based, centrally-controlled, wireless network includes embedding auxiliary network information in a header portion of a packet transmitted over the network by a central controller; receiving a packet having auxiliary network information therein by a device in the network; rebroadcast, by the device in the network, of the packet having auxiliary network information therein in a predetermined time slot, wherein the predetermined time slot is predetermined by the central controller; and receiving, by a device not already on the network, of the auxiliary network information bearing packet, thereby allowing the device not already on the network to join the network.

It is an object of the invention to allows a device to rebroadcast relevant information retrieved from beacons whenever it acquires the transmission opportunities as reserved by the coordinator.

Another object of the invention is to provide for efficient communication over Wireless Personal Area Networks (WPANs), in terms of a piconet.

A further object of the invention is to provide, for systems using a central-control type access scheme, a device in the piconet which acts as the coordinator and is responsible for periodically sending beacon signals according to a pre-determined interval name superframe.

Another object of the invention is to provide for multiple piconets to operate in overlapped areas simultaneously without coordination prior to deployment.

This summary and objectives of the invention are provided to enable quick comprehension of the nature of the invention.

A more thorough understanding of the invention may be obtained by reference to the following detailed description of the preferred embodiment of the invention in connection with the drawings.

DETAILED DESCRIPTION OF THE PREFERRED EMBODIMENTS

Figure 1:
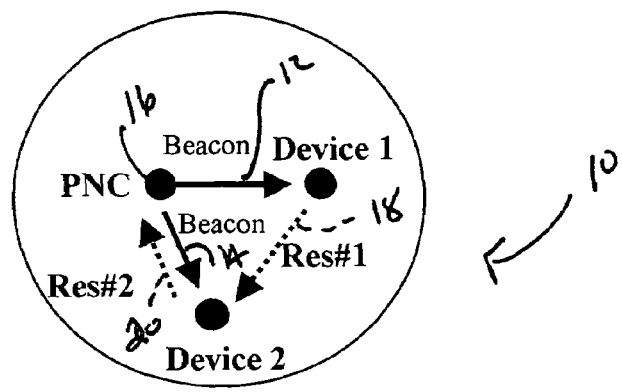
FIG. 1 depicts a prior art piconet configuration.

The method described herein allows a device to rebroadcast relevant information retrieved from beacons whenever it acquires the transmission opportunities, as reserved by a coordinator or controller. The information which may be rebroadcast includes, but is not limited to, (1) reservation for channel time of the transmitting device, (2) superframe timing, and (3) other network information elements for various purposes. A device, whether it's a coordinator itself or not, which may not receive beacons from other coordinators of nearby piconets, is able to pick up needed network information from its immediate surroundings if there are devices transmitting within its radio range.

There are various names for the device responsible for beacon transmissions, e.g., access point in 802.11 WLAN (AP), coordinator in 802.15.3 piconet (PNC) (IEEE Std 802.15.3™-2003, Part 15.3: Wireless Medium Access Control (MAC) and Physical Layer (PHY) Specifications for High Rate Wireless Personal Area Networks (WPANs)), controller, or master, in some TDMA type networks. In the following descriptions, the term "PNC" is used generally, however, the scope of this invention is not limited to that of IEEE 802.15.3 WPAN protocols, and is applicable to any network protocol so long as the mechanism of maintaining superframe and/or beacon timing are the same or similar to that of IEEE 802.15.3, and channel time allocation is made via request/grant reservation to/from the coordinator.

A specific application for this invention is networks which are used for short range wireless communications, which are known as Wireless Personal Area Networks (WPANs), the operation of which may be described in terms of a "piconet." A "piconet" is a cluster of wireless devices collectively performing certain networking functions in close proximity, usually within ten meters of one another. At a minimum, a piconet requires two devices which communicate with each other for networking applications. For systems using central-control type access scheme, one device in the piconet acts as the coordinator, and is responsible for periodically sending beacon signals, at pre-determined intervals, wherein each interval is referred to as a "superframe." All other devices in the piconet have to first detect beacons in order to maintain synchronization, or to gain initial acquisition of the piconet. Thus, the coordinator controls timing, allocation of channel time, primarily through the management of beacon packets. The coordinator is also referred as a controller, a master, or an access point (AP) in systems using a central-control type access protocol.

In a typical environment, such as a home, multiple piconets will be inevitably setup and simultaneously operate in overlapping areas, without coordination prior to deployment. It is possible that some piconets will be forced to share the same channel when the number of piconets exceeds that of available channels, because the number of channels is limited in a finite spectrum which is allocated for a specific system. It should be noted that the channel partition protocol may be a FDM type, in frequency domain, a CDMA type, in code space, or other applicable protocols.

The method of the invention provides a protocol for a device to rebroadcast auxiliary network information as the information is retrieved from beacons whenever the device is allowed to transmit in its reserved, predetermined by the controller, time slots. Such information may include reservation, i.e., assignment of channel time allocation of the transmitting device, superframe timing, and other piconet information elements, conveyed via beacons from the coordinator. Any nearby device is able to retrieve a portion of beacon information as relayed, even if the device is out of range of the coordinator and can not directly receive the coordinator's beacon signals. It should be noted that the intended audience of such rebroadcast are those devices in a separate piconet using the same channel, whether or not the device is, itself a coordinator, or not, or a device which is not yet associated with any piconet and is searching for a piconet/coordinator to begin its applications.

An advantage of the method of the invention is that it effectively expands the coverage of beacon signals and improves the awareness of other piconets' existence. This is crucial for ad hoc networks from which peer-to-peer communications are expected. The ability to discover surrounding piconets allows a device to make better decisions when adapting to a variety of operating conditions.

The method of the invention takes advantage of the regular transmission opportunities which have been previously reserved for traffic. Any device may become a candidate to rebroadcast when it's due for transmissions. A foreign device outside the range of the coordinator therefore has greater probability to find an existing piconet and to learn information about a piconet from one, or even multiple, devices, provided the other devices are within range. For existing traffic, the overhead is minimal because the added, or auxiliary network, information is embedded in a header portion of a packet, and not all of the beacons are repeated.

Beacon packets carry information for superframe timing management and time reservation for individual device, as illustrated in the frame format of Table 1.

TABLE 1

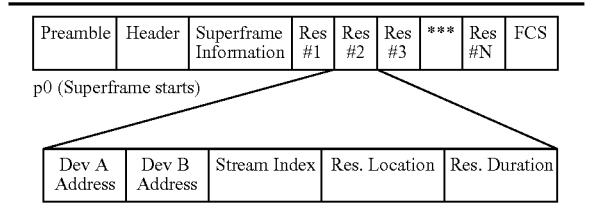

A device which correctly receives beacons from PNC will be able to determine the instant p0, which is the reference starting point of superframes. The next superframe, and beacon, will therefore occurs at:

$$p0'=p0+\text{Superframe Duration}, \quad (1)$$

where "Superframe Duration" is a typical embodiment of the superframe information field. Other pertinent information regarding timing management and synchronization of the piconet may also be included. Each reservation block contains the address of source/destination devices, stream index for identification of traffic type, and location/duration of reservation in time. The Res. Location field indicates the time offset from p0. As a result, the device that assigned a reservation is allowed to commence transmission at time, d0, where:

$$d0=p0+\text{Res. Location}, \quad (2)$$

and any transmission shall end at, or before d, where:

$$d=d0+\text{Res. Duration} \quad (3)$$

It can be concluded from above descriptions that the operation of such a network depends on successful reception of the beacons by each device. Once a device retrieves superframe duration, correct time reservation, and other network management information from a beacon, it is able to schedule the packet transmissions for intended applications.

Simultaneous Operating Piconets

Figure 2:
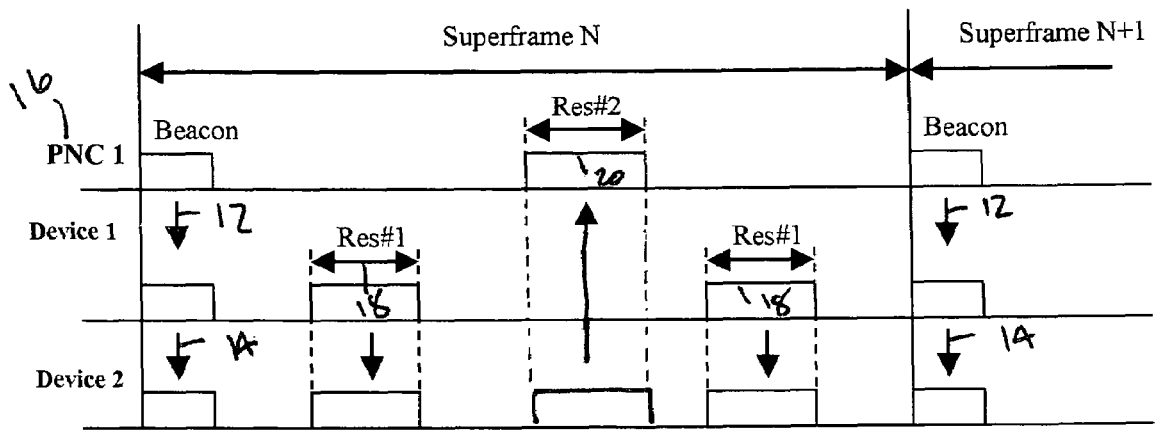
FIG. 2 depicts a prior art superframe timing.

The topology of prior art FIGS. 1 and 2 works well for a simple piconet in which all devices are expected to be within coverage area of PNC and each device, upon completion of scanning the channels, chooses to join the piconet by associating with the PNC. This is the simplest scenario of the prior art. The method of the invention is directed to those scenarios where multiple piconets are simultaneously operating.

Radio Resources Sharing

If a device, for any reason, decides to start a new piconet, even though it can locate beacons from one or more existing PNCs, there are two options: first, a device may select channels, not being used by the existing piconet, and become a PNC itself. In this scenario, the isolation between piconets is supported by physical layer (PHY) parameters, such as coding, modulation, and relative received signal strength of desired/undesired signals. This is a common practice in wireless communication systems.

A second option is to use the same channel as is used by an existing PNC. This occurs when no alternative channels are available because of congestion or interference. It is possible because the radio spectrum normally can only support a finite number of channels, regardless of available bandwidth and channel partitions in a specific system design. A method of sharing the same channel by two piconets is to use time division multiplexing, as described in IEEE 802.15.3 MAC protocol, which provides the so called parent/dependent piconet mechanism to fulfill such purpose. A device may request a static channel time allocation (CTA) from an existing PNC and start its own piconet by sending beacons at the beginning of a granted CTA period. The PNC of a dependent piconet is synchronous with the parent (existing) piconet, but only has the assigned CTA duration at its disposal for traffic. On the other hand, the parent PNC will lose control over the CTA period allocated to dependent piconet in it superframe. This approach is applicable only when two devices (PNCs) are within radio coverage areas of each other.

Un-Coordinate Piconets

Figure 3:
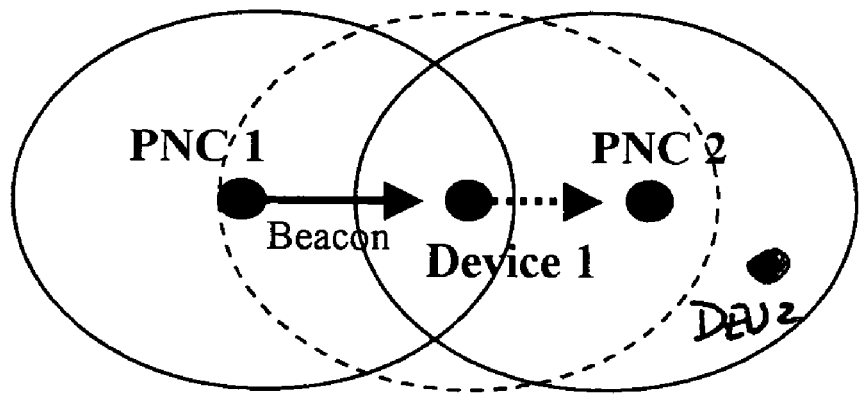
FIGS. 3 and 4 depict use of simultaneous piconets operating on the same channel.
Figure 4:
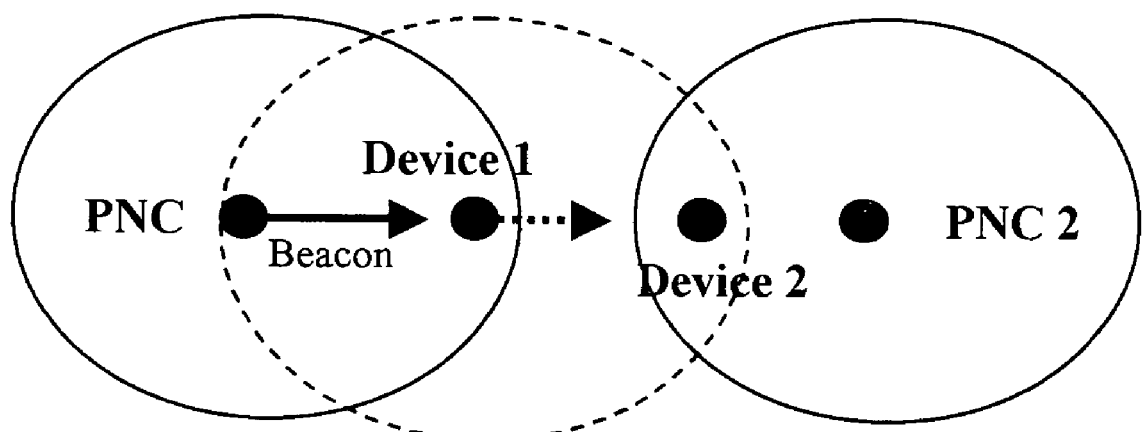

There are, however, scenarios wherein devices can not receive the PNC beacons directly because of limited PNC radio range. Instead, the devices may be in close proximity to devices in the fringe area of an existing piconet, and will pick up a signal from those devices. FIG. 3 and 4 illustrate two such cases. In FIG. 3, it is possible that PNC 2 and its associated devices, DEV 2, are portable, and operate on the same channel as used by PNC 1. After the piconet PNC 2/DEV 2 is established, it may be moved to a location such that PNC 2 is in the coverage of DEV 1 (dashed oval), but not PNC 1, without knowledge of PNC 1 & DEV 1's presence. In FIG. 4, it is possible that PNC 2 did not find either PNC 1 or DEV 1, e.g., both are out of radio range, during the time when it was scanning for beacons. PNC 2 initiated its own piconet, but coincidentally chose the same channel being used by PNC1. DEV 2 could join PNC 2 later, even though it can also receive signals transmitted by DEV 1, as it can only receive beacons from PNC 2.

The scenarios of FIGS. 3 and 4 are likely to occur in complicated environments such as home networking, where (1) both stationary and portable devices are used for various purposes, or equivalently (2) network topology/radio coverage changed due to movement of people and/or objects. It is desirable that such devices/applications may be deployed in ad hoc manners and that zero, or minimum, configuration parameters regarding how/when/where the devices are being used must be provided to a user to enable easy use by consumers. However, this poses challenges for systems designed for such purposes.

For two piconets operating on the same channel, the drawback of time sharing approach used by parent/dependent piconet scheme is that it requires two PNCs to be within range of each other and to communicate directly. If even more piconets are involved, a chain of parent/dependent piconet relations must be established. In practice, it is very difficult to manage and the efficiency of channel usage drastically decreases. In such situations, only one piconet is allowed to use the channel at one time and no channel reuse is possible, even though not all involved piconets are overlapping.

Rebroadcast of Beacon Information

A solution to the aforementioned issue of multiple piconets is to provide a mechanism for effectively expanding the coverage of beacons from PNC such that other devices/PNC may easily detect the presence of an existing piconet. Once a device is aware of another piconet's presence, it is possible to take proper actions for better network operations. Potential usage of beacon information in adjacent piconets is not the topic of this disclosure, it could include, but is not limited to, the following: (1) coexistence of multiple piconets; (2) coordination/synchronization of piconets; and (3) device discovery.

TABLE 2

Quasi-Beacon Mechanism

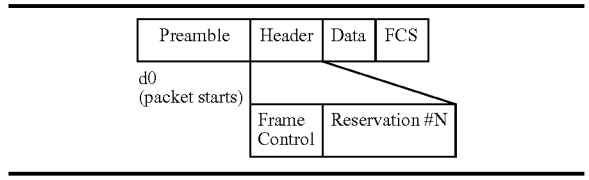

Table 2 illustrates the timing chart of packet exchanges as would occur for the scenarios of FIG. 3 or 4. Although DEV 1 may transmit to other devices legitimately during time slot of Res. #n, as assigned by PNC 1, the transmissions appear as interference to other devices not associated with PNC 1 within range of DEV 1.

Figure 5:
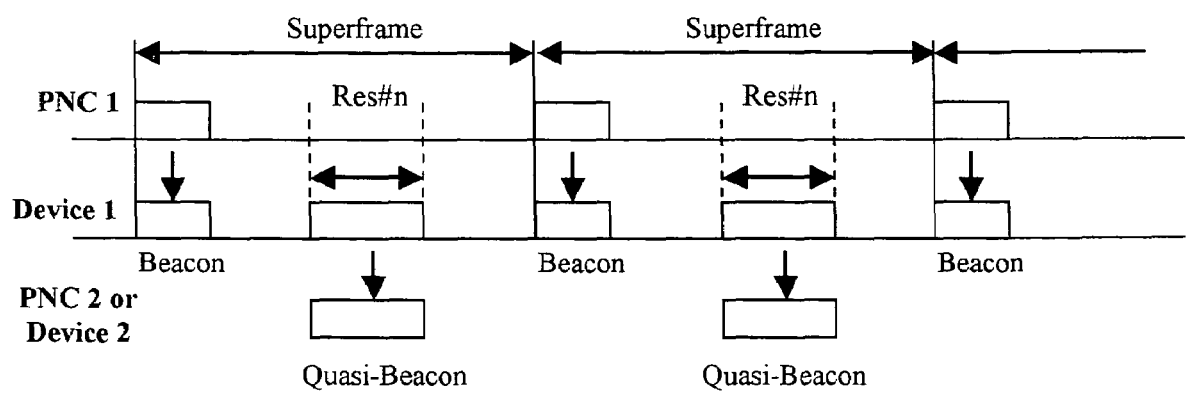
FIG. 5 depicts timing of packet exchanges in the invention.

However, use of the frame format shown in Table 2, provides that, when device#n transmits in its reserved time slot, and Res. #n is one of reservation blocks in a beacon of the form in Table 1, PNC 2 and/or Dev 2 can decode the header part and disregard the data portion. Therefore PNC2/Dev 2 effectively acquire the knowledge of Res. #n's, and the packets virtually relay certain part of information (Res. #n) from original beacons of PNC 1. It is hence marked as quasi-beacon in FIG. 5.

In this mechanism, only the reservation field corresponding to the transmitting device is used and advertised according to beacons from PNC 1, which makes the decision for each allocation. A device only needs to advertise its own reservation during rebroadcasting, as not all devices in the piconet will necessarily be within the range of a foreign, i.e., not associated with the PNC, device located in peripheral region of the piconet such as that shown in FIGS. 3 and 4.

In the event that a device itself is the PNC of a dependent piconet and sends its own beacons, the reservation for parent PNC, as broadcast by the dependent PNC, should not be considered channel time allocated for use by the dependent piconet. It is intended for the parent piconet and therefore, the dependent PNC has no control over this reservation. Those devices in the dependent piconet are not allocated for time in such a private duration.

Regarding coexistence, those reserved time slots during which the potential "victim" receiver would experience transmitting power need to be considered. It is desirable because, in a dynamic environment, where portable devices are moved around, or people movements and furniture layout causes variations in radio propagation paths, the number of detected reservations by a device changes constantly, and may result in the formation of more than one piconet. PNC#2, is able to collect directly (FIG. 3) or indirectly (FIG. 4) the timing information for potential interference from devices associated with PNC#1 to devices under its control.

If the device in an overlapping area, e.g., Dev 1 in FIG. 3, is the destination of data from another device (not shown), the reservation information is embodied in an ACK frame, which is normally used for acknowledgement upon receipt of a data frame. This is a likely scenario because a reservation by a PNC typically involves two devices, as shown in Table 1, and either device may be the source or destination of data. In some situations, the occurrences of ACK are less than that of data frame, nevertheless, the method as described herein is applicable.

If an application requires streaming data from a source to a destination without acknowledgement, the PNC composes the reservation information and instructs the destination station to rebroadcast the upcoming occupation of channel time before the source actually starts sending data.

In an alternative embodiment of the packet header, superframe information is included, as shown in Tables 3 and 4. This allows a device to predict the beacon starting time (p0') of another PNC by using Eq. (1) & (2).

In another embodiment, shown in Table 4, the field of PNC address is added to the header. It could be used when a device (or a PNC) is actively looking for another piconet. Thus, it helps to speed up the process of finding devices in another piconet by identifying the PNC first.

TABLE 3

Header Alternate Embodiment #1

| Frame Control | Superframe Information | Reservation #n |

TABLE 4

| Header Alternate Embodiment #2 | | | |
|---|---|---|---|
| Frame Control | Superframe Information | Reservation #n | PNC Address |

Thus, a method for beacon rebroadcast in centrally controlled wireless systems has been disclosed. It will be appreciated that further variations and modifications thereof may be made within the scope of the invention as defined in the appended claims.

I claim:

1. A method of beacon rebroadcast for use in a packet-based, centrally-controlled, wireless network, wherein there are two wireless networks each with its own central controller, the method comprising:

broadcasting, from the central controller in the first network, a beacon packet containing a superframe timing field and a plurality of time reservation blocks, each time reservation block being assigned to and associated with a unique one of a plurality of devices in the first network and representing the reserved time slot during which the assigned device may broadcast;

receiving, by a device in the first network but not within radio range of the central controller of the second network, the beacon packet including the time reservation block assigned to said device in the first network;

embedding only the time reservation block assigned to said device in the first network, in a header portion of a data packet to be transmitted by said device in the first network;

rebroadcasting, by said device in the first network in its reserved time slot, a quasi-beacon packet containing, from the beacon packet, only the time reservation block assigned to said device, said rebroadcasting comprising broadcasting said data packet with said header having embedded therein only said time reservation block assigned to said device; and receiving, by a device in the second network that is within radio range of said device in the first network but not within radio range of the central controller in the first network, said quasi-beacon packet, thereby allowing said device in the second network to detect the presence of the first network;

wherein said device in the second network, upon receipt of said data packet with said header having embedded therein only said time reservation block assigned to said device in the first network, decodes only the header of said data packet, and recognizes that said data packet is not from the second network, whereupon, said device in the second network ignores the remainder of said data packet.

2. A method of beacon rebroadcast for use in a packet-based, centrally-controlled, wireless piconet network, comprising:

broadcasting, from a piconet central controller (PNC) having a unique PNC address, a beacon packet containing a superframe timing field and a plurality of time reservation blocks, each time reservation block being assigned to and associated with a unique one of a plurality of devices in the piconet and representing the reserved time slot during which the assigned device may broadcast;

receiving the broadcast superframe timing field and time reservation blocks by a device in the piconet;

embedding the superframe timing field and time reservation block assigned to said device in a header portion of a data packet to be transmitted over the piconet by said device without embedding the PNC address in said header portion;

rebroadcasting, by said device in the piconet, the superframe timing field and time reservation block assigned to said device by transmitting said data packet with said header portion in the reserved time slot assigned to said device; and receiving, by a device not in the piconet, not associated with any piconet and not within radio range of the PNC, said data packet with said header portion rebroadcast by said device in the piconet, thereby allowing said device not in the piconet, without knowledge of the PNC address, to predict the staffing time for beacon packets broadcast by the PNC and join the piconet.

* * * * *

UNITED STATES PATENT AND TRADEMARK OFFICE
CERTIFICATE OF CORRECTION

| | |
|---|---|
| PATENT NO. | : 7,460,503 B2 |
| APPLICATION NO. | : 10/831097 |
| DATED | : December 2, 2008 |
| INVENTOR(S) | : Song-Lin Young |

It is certified that error appears in the above-identified patent and that said Letters Patent is hereby corrected as shown below:

In column 10, line 39, delete the word "staffing" and replace with the word "starting".

Signed and Sealed this

Third Day of March, 2009

JOHN DOLL
*Acting Director of the United States Patent and Trademark Office*